United States Patent [19]

Mizukami et al.

[11] Patent Number: 5,363,012
[45] Date of Patent: Nov. 8, 1994

[54] PIGMENT-ATTACHED BLUE-EMMITTING PHOSPHOR AND COLOR CATHODE-RAY TUBE

[75] Inventors: Tomohito Mizukami; Chihito Funayama, both of Odawara, Japan

[73] Assignee: Kasei Optonix, Ltd., Tokyo, Japan

[21] Appl. No.: 115,552

[22] Filed: Sep. 3, 1993

[30] Foreign Application Priority Data

Sep. 7, 1992 [JP] Japan .................. 4-238222

[51] Int. Cl.$^5$ .......................... H01J 29/18
[52] U.S. Cl. .................. 313/468; 106/426; 106/479; 106/480; 106/481; 252/301.4 F; 252/301.4 R; 252/301.4 H; 252/301.4 S; 252/301.5; 252/301.6 S; 252/301.6 F; 313/467; 313/479; 428/404
[58] Field of Search .......... 252/301.4 R, 301.4 F, 252/301.4 H, 301.4 S, 301.5, 301.6 F, 301.6 S; 106/426, 479, 480, 481; 427/64, 68, 219; 428/404; 313/467, 468, 479

[56] References Cited

U.S. PATENT DOCUMENTS

| | | | |
|---|---|---|---|
| 3,483,416 | 12/1969 | Vermeulen | 313/467 |
| 4,544,605 | 10/1985 | Miyazaki et al. | 428/404 |
| 4,690,832 | 9/1987 | Yale | 252/301.6 F |

FOREIGN PATENT DOCUMENTS

| | | | |
|---|---|---|---|
| 405840 | 3/1974 | U.S.S.R. | 106/426 |
| 1011574 | 4/1983 | U.S.S.R. | 106/426 |

Primary Examiner—Jack Cooper
Attorney, Agent, or Firm—Oblon, Spivak, McClelland, Maier & Neustadt

[57] ABSTRACT

A pigment-attached blue-emitting phosphor comprising a blue-emitting phosphor and a blue pigment attached to the surface of the blue-emitting phosphor, said blue pigment being a $CoO \cdot ZnO \cdot SiO_2$ type pigment containing Mo.

5 Claims, 1 Drawing Sheet

PIGMENT-ATTACHED BLUE-EMMITTING PHOSPHOR AND COLOR CATHODE-RAY TUBE

The present invention relates to a pigment-attached blue-emitting phosphor suitable for a fluorescent layer of e.g. a color cathode-ray tube and to a color cathode-ray tube provided, on the inner surface of a face plate, a fluorescent layer containing such a pigment-attached blue-emitting phosphor, or a color cathode-ray tube provided with a blue pigment layer disposed between the inner surface of a face plate and a blue phosphor picture element.

To improve the contrast of images of color cathode-ray tubes, fluorescent display tubes, etc., there have been known a method which employs a pigment-attached phosphor wherein filter particles capable of absorbing the reflection of an exterior light at a fluorescent screen, are attached to the phosphor surface (U.S. Pat. Nos. 3,886,394 and 4,307,320), and a method which employs colored glass as the face plate of a cathode-ray tube.

In the method which employs colored glass as the face plate of a cathode-ray tube, the transmittance of glass is reduced, whereby the contrast can be selected relatively readily within a practical range, but, the absorption of not only the exterior light but also the emission from the fluorescent layer increases, whereby the reduction of brightness is substantial.

Whereas, the method which employs the pigment-attached phosphor having filter particles attached, is a method effective for improving the contrast without reducing the brightness of a screen as far as possible.

The above filter particles are used sometimes for sharpening the emission spectrum of a phosphor. Such filter particles are required to have a transmittance high in the emission wavelength region of the phosphor and low in other wavelength regions. By this characteristic of the transmittance, light components which do not correspond to the emission of the phosphor itself will be absorbed, whereby the contrast under a bright exterior light can be improved.

With respect to the blue-emitting phosphor, it is suitable to use a pigment which has an absorption as small as possible at about 450 nm which is the emission peak of the phosphor, and an absorption as large as possible within the other wavelength regions.

As blue pigments of this type, there have been proposed ultramarine ($3NaAl.SiO_2.Na_2S_2$), prussian blue ($Fe_4[Fe(CN)_6]_3.nH_2O$), cobalt aluminate ($CoO.nAl_2O_3$) cerulean blue ($CoO.nSnO_2$), copper sulfide (CuS), etc. in Japanese Unexamined Patent Publication No. 28784/1979.

However, from researches by the present inventors, it has been found that the body color of cobalt aluminate commonly employed, does not correspond to the emission spectrum of the blue-emitting phosphor. The reflectance of the cobalt aluminate is especially high at around 490 nm, such being ineffective to improve the contrast.

The ultramarine practically used to some extent has excellent properties as compared with the cobalt aluminate, but its chemical stability is very poor, whereby a problem of fading in the attaching step to the phosphor or in the coating step to the cathode-ray tube is brought about.

To prevent the fading, it has been known to employ a method wherein the ultramarine pigment is covered with a silicic compound. However, when it is coated on a cathode-ray tube, there is a problem that its body color is remarkably changed by irradiation of electron beams, whereby a shift of the peak in the emission spectrum of the fluorescent screen is likely to occur.

On the other hand, the $CoO.ZnO.SiO_2$ type blue pigment of Japanese Patent Application No. 148636/1991 proposed earlier by the present inventors, are superior to the cobalt aluminate and the ultramarine in the color tone and fastness of the pigment-attached phosphor. However, the inorganic oxide pigment of this type is produced by a method wherein starting materials of oxides or carbonates or chlorides are mixed in a dry system and fired at a temperature above 900° C., followed by cooling and pulverization, and with the phosphor having this $CoO.ZnO.SiO_2$ type blue pigment attached thereon, the color stability in the baking step (at about 500° C. for about one hour) for the production of a cathode-ray tube is not necessarily adequate. Accordingly, for cathode-ray tubes, for which high image qualities have been increasingly demanded in recent years, it has been required to improve the heat resistance of the pigment-attached phosphors to improve the qualities of the cathode-ray tubes.

Under these circumstances, it is an object of the present invention to solve the above problems and to provide a pigment-attached blue-emitting phosphor by attaching a blue pigment excellent in the heat resistance so that excellent blue-emission can be obtained even when subjected to the baking step for the production of a cathode-ray tube, to provide a color cathode-ray tube provided with a fluorescent layer containing such a pigment-attached blue-emitting phosphor, and to provide a color cathode-ray tube having a layer of such a blue pigment disposed between a face plate and a blue phosphor picture element.

The present invention provides a pigment-attached blue-emitting phosphor comprising a blue-emitting phosphor and a blue pigment attached to the surface of the blue-emitting phosphor, said blue pigment being a $CoO.ZnO.SiO_2$ type pigment containing Mo.

The present invention also provides a color cathode-ray tube comprising a face plate having, on the inner surface thereof, a fluorescent layer containing such a pigment-attached blue-emitting phosphor.

Further, the present invention provides a color cathode-ray tube comprising a face plate, a blue phosphor picture element and a layer of a $CoO.ZnO.SiO_2$ type blue pigment containing Mo, said layer being disposed between the inner surface of the face plate and the blue phosphor picture element.

Here, the $CoO.ZnO.SiO_2$ type pigment containing Mo is the one obtained by firing raw materials containing Co, Zn, Si and Mo usually at a temperature of at least 800° C. for several tens minutes to several tens hours, followed by cooling and pulverization. This pigment includes a mixture of oxides of the respective elements or a composite oxide thereof, a mixture of cobalt silicate and zinc silicate or a solid solution of both, and a mixture thereof. The raw material containing Mo is considered to function mainly as a flux or mineralizer during the formation of the pigment.

The compositional ratio of the $xCoO.yZnO.zSiO_2$ type pigment is preferably within ranges of $0.05 \leq x/z \leq 1.5$ and $0.1 \leq y/z \leq 2.0$, particularly preferably within ranges of $0.2 \leq x/z \leq 1.0$ and $0.3 \leq y/z \leq 1.7$. If the ratio is outside the ranges, the color tone tends to change, such being sometimes not suitable for the blue pigment to be combined with the blue-emitting phosphor. The content of Mo is preferably within a range of from 0.01 to 10% by weight, more preferably from 0.1 to 2% by weight. If the content is less than this range, improvement in the heat resistance tends to be inadequate. If it exceeds this range, the color tone tends to change, such being undesirable.

It is possible to incorporate various fluxes and other elements at the time of firing the above pigment, if necessary. More specifically, it is possible to incorporate Li, Na, K, Ca, Mg, Ba, Fe, Ni, Cu, Mn, Ti, V, Al, Sn, Sb, Cr, Pr, etc. These elements may be added within a range of not more than about 5% by weight in total. If the amount exceeds this limit, it becomes impossible to obtain a desirable color tone as the blue pigment.

The blue-emitting phosphor useful for the present invention includes those having a main part of the emission spectrum within the range of from 380 to 500 nm, more specifically, a silver-activated zinc sulfide type phosphor [ZnS:Ag,X (wherein X is halogen or Al), ZnS:Ag,M,X (wherein M is Ga, In, etc., and X is halogen or Al)], $Y_2SiO_5$:Ce, $Ca_2B_5O_9Cl$:Eu, $(Ba_xMg_{1-x})O \cdot nAl_2O_3$:Eu ($0 \leq x \leq 1$, $7 \leq n \leq 8$), $SrSi_3O_8Cl_4$:Eu, $CaWO_4$, $CaWO_4$:Pb, BaFCl:Eu, $Gd_2O_2S$:Tb and ZnS:Zn.

The amount of the above blue pigment attached to the blue-emitting phosphor is preferably within the range of from 0.3 to 15 wt %. If the attached amount is below the lower limit, the filter effect tends to be too small, and if it exceeds the upper limit, the luminescence brightness tends to be insufficient.

In the course of various studies of $xCoO \cdot yZnO \cdot zSiO_2$ type pigment-attached blue-emitting phosphors, the present inventors have found that the heat resistance of the above pigment containing Mo is improved, that the color stability of the phosphor having such a pigment attached thereon, is improved, and that it is possible to obtain a fluorescent screen having a high contrast while maintaining brightness by coating such a pigment-attached phosphor on a face plate, or by coating such a pigment in the form of a layer disposed between the face plate and the blue-emitting phosphor layer, and it is thereby possible to provide a color cathode-ray tube which can be easily viewed even under a bright exterior light.

The reason for the improvement in the heat resistance of the above pigment is not clearly understood. However, it is considered that by using Mo, the crystal structure of the pigment is made firm and hardly susceptible to a deterioration of the crystal surface during the pulverization step after firing the pigment.

Figure 1:
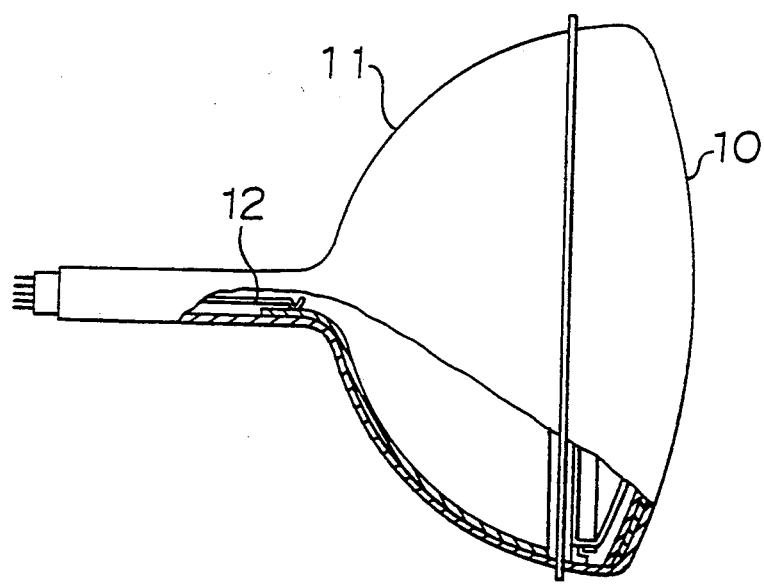
FIG. 1 is a partially cutaway side view of the color cathode-ray tube of the present invention having pigment layers and phosphor picture elements laminated on a face plate.
Figure 2:
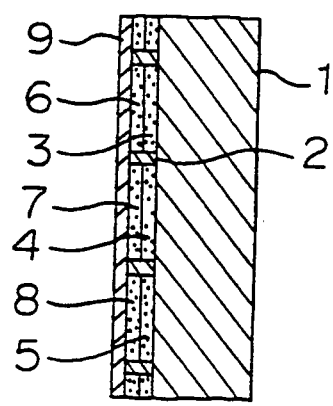
FIG. 2 is an enlarged sectional view of a main part of the fluorescent screen of FIG. 1.

The formation of a pigment layer on the face plate is carried out by a photolithography technique like the formation of the fluorescent layer. Firstly, a first pigment slurry, for example, a slurry composed of a mixture of a green pigment and a photosensitive binder comprising ammonium dichromate and polyvinyl alcohol, is coated on the inner surface of a face plate 1 previously having a black matrix 2 formed thereon, and dried to form a layer. This layer is exposed to a light through a shadow mask, and developed to form a green pigment layer 3 into a predetermined pattern. Then, a second pigment slurry, for example, a blue pigment slurry composed of a mixture of a blue pigment and a photosensitive binder, is used to form a blue pigment layer 4 into a predetermined pattern in the same manner as in the above at a position other than the above green pigment layer 3. Further, a third pigment slurry, for example, a red pigment slurry is used to form a red pigment layer 5 into a predetermined pattern in the same manner as in the above at a position other than the green pigment layer 3 and the blue pigment layer 4.

Then, a green phosphor, a blue phosphor and a red phosphor are coated on the pigment layers of the respective colors by a photolithography technique to form a green phosphor picture element 6, a blue phosphor picture element 7 and a red phosphor picture element 8. Further, an aluminium layer is vapor-deposited thereon to form a metal back 9, whereby a fluorescent screen is completed on the face plate 1. A panel 10 provided with this face plate 1 is sealed with a funnel 11, and an electron gun 12 is mounted thereon to complete a color cathode-ray tube.

The color cathode-ray tube employing the pigment-attached blue-emitting phosphor of the present invention, can be prepared by attaching the pigment-attached blue-emitting phosphor picture element directly on the face plate omitting the pigment layer of FIG. 1.

Now, the present invention will be described in further detail with reference to Examples. However, it should be understood that the present invention is by no means restricted by such specific Examples. In the following Examples, "parts" means "parts by weight".

Preparation of a Mo-containing blue pigment

60 Parts of cobalt oxide, 103 parts of zinc oxide, 64 parts of silicon oxide and 19 parts of $Na_6(Mo_7O_{24}) \cdot 22H_2O$ were mixed and fired in air at 900° C. for 2 hours, then cooled and pulverized to obtain a $xCoO \cdot yZnO \cdot zSiO_2$ pigment (x=0.8, y=1.3, z=1.0) having a Mo content of 0.5% by weight and an average particle size of 0.5 μm.

EXAMPLE 1

100 Parts of distilled water was added to 100 parts of a silver-activated zinc sulfide blue-emitting phosphor to obtain a slurry, and 5 parts of the above blue pigment and 0.3 part of a SBR emulsion (the amount of the resin per 100 parts of the phosphor) were added thereto and mixed. The pH of the mixed slurry was adjusted to attach the pigment to the phosphor, followed by filtration and drying at 120° C. for 15 hours to obtain a pigment-attached blue-emitting phosphor.

EXAMPLE 2

Using a pigment slurry comprising 5 parts of the above blue pigment, 2 parts of polyvinyl alcohol (polymerization degree: 2400, saponification degree: 88%), 0.15 part of sodium dichromate, 0.03 part of a surfactant and the rest being water, a blue pigment layer having an average thickness of 1 μm was formed on the inner surface of a face plate by photolithography.

Then, using a ZnS:Ag,Cl blue-emitting phosphor, a blue phosphor picture element was formed on the above blue pigment layer in accordance with a conventional method.

Example for the preparation of a conventional blule pigment

60 Parts of cobalt oxide, 103 parts of zinc oxide and 64 parts of silicon oxide were mixed and fired in air at 1300° C. for 2 hours, then cooled and pulverized to obtain a $xCoO \cdot yZnO \cdot zSiO_2$ pigment ($x=0.8$, $y=1.3$, $z=1.0$) having an average particle size of 0.6 μm.

COMPARATIVE EXAMPLE 1

A pigment-attached blue-emitting phosphor was prepared in the same manner as in Example 1 except that in Example 1, the above conventional blue pigment was used instead of the Mo-containing blue pigment.

COMPARATIVE EXAMPLE 2

A blue pigment layer and a blue-emitting phosphor picture element were formed on the inner surface of a face plate in the same manner as in Example 2 except that in Example 2, the above conventional blue pigment was used instead of the Mo-containing blue pigment.

COMPARATIVE EXAMPLE 3

A blue-emitting phosphor picture element was formed in the same manner as in Example 2 except that in Example 2, the Mo-containing blue pigment layer was omitted.

Heat resistance test

To the pigment-attached phosphors of Example 1 and Comparative Example 1, baking treatment was applied at 500° C. for one hour, and the powder reflectance (%) at 450 nm was measured before and after the treatment, whereupon the change [(before−after)/before x 100%] was determined. The results are shown in Table 1.

It is evident from Table 1 that by the addition of Mo, the change in the powder reflectance before and after the baking treatment becomes extremely small, which indicates that the heat resistance of the pigment-attached phosphor is improved.

TABLE 1

| | Powder reflectance (%) | | |
|---|---|---|---|
| | Before baking | After baking | Change (%) |
| Example 1 | 79.0 | 78.8 | 0.3 |
| Comparative Example 1 | 74.5 | 62.0 | 16.8 |

Test on luminance and contrast

The surface of the face plates of Example 2 and Comparative Examples 2 and 3, was irradiated with an exterior light, and the white luminance of the highlight parts (white-emitting parts under mounted condition) and the luminance of the shadow parts (non-emitting parts under mounted condition) were measured, and their ratio was calculated. The white luminance and the ratio as the contrast are shown in Table 2.

It is evident from Table 2 that with the fluorescent screen of Example 2, the reduction of the white luminance is little as compared with Comparative Example 2, which indicates that a high contrast is maintained.

TABLE 2

| | White luminance | Contrast |
|---|---|---|
| Example 2 | 96 | 128 |
| Comparative Example 2 | 90 | 120 |
| Comparative Example 3 | 100 | 100 |

According to the present invention, by adopting the above construction, it has been made possible to improve the heat resistance of a pigment-attached blue-emitting phosphor and to provide a blue-emitting phosphor excellent in the color stability, which is useful for the production of a color cathode-ray tube. Further, a fluorescent screen having a high contrast can be obtained while maintaining the brightness either by forming the above-mentioned blue pigment layer between the inner surface of a face plate and a blue phosphor picture element, or by forming the blue pigment-attached blue-phosphor picture element on the inner surface of a face plate, whereby it has been made possible to provide a color cathode-ray tube which can be easily viewed even under bright lightning.

We claim:

1. A pigment-attached blue-emitting phosphor comprising a blue-emitting phosphor and from 0.3 to 15% by weight of a blue pigment attached to the surface of the blue-emitting phosphor, said blue pigment being represented by the formula $$xCoO \cdot yZnO \cdot zSiO_2$$

wherein the compositional ratio is within the range of $0.05 \leq x/z \leq 1.5$ and $0.1 \leq y/z \leq 2.0$, wherein said pigment contains from 0.01 to 10% by weight of Mo and wherein said pigment is prepared by firing compounds containing Co, Zn, Si and Mo.

2. The pigment-attached blue-emitting phosphor according to claim 1, wherein the blue pigment contains at most about 5% by weight in total of Li, Na, K, Ca, Mg, Ba, Fe, Ni, Cu, Mn, Ti, V, Al, Sn, Sb, Cr and Pr.

3. The pigment-attached blue-emitting phosphor according to claim 1, wherein the blue-emitting phosphor is at least one member selected from the group consisting of ZnS:Ag,X wherein X is halogen or Al, ZnS:Ag,M,X wherein M is Ga or In, and X is halogen or Al, $Y_2SiO_5$:Ce, $Ca_2B_5O_9Cl$:Eu, $(Ba_xMg_{1-x})O \cdot nAl_2O_3$:Eu ($0<x<1$, $7<n<8$), $SrSi_3O_8Cl_4$:Eu, $CaWO_4$, $CaWO_4$:Pb, BaFCl:Eu, $Gd_2O_2S$:Tb and ZnS:Zn.

4. A color cathode-ray tube comprising a face plate having, on the inner surface thereof, a fluorescent layer containing a pigment-attached blue-emitting phosphor as defined in claim 1.

5. A color cathode-ray tube comprising a face plate, a blue phosphor picture element and a layer of a blue pigment containing Mo, said blue pigment being represented by the formula $$xCoO \cdot yZnO \cdot zSiO_2$$

wherein the compositional ratio is within the range of $0.05 < x/z \leq 1.5$ and $0.1 \leq y/z \leq 2.0$, wherein said pigment contains from 0.01 to 10% by weight of Mo and wherein said pigment is prepared by firing compounds containing. Co, Zn, Si and Mo, said layer being disposed between the inner surface of the face plate and the blue phosphor picture element.

* * * * *